United States Patent [19]
Gibbs

[11] Patent Number: 5,237,772
[45] Date of Patent: Aug. 24, 1993

[54] DOUBLE BARBED FISHHOOK IMPROVEMENT

[75] Inventor: Louie W. Gibbs, Clermont, Fla.

[73] Assignee: Classic Manufacturing Co., Inc., Clermont, Fla.

[21] Appl. No.: 859,118

[22] Filed: Mar. 27, 1992

Related U.S. Application Data

[63] Continuation-in-part of Ser. No. 562,614, Aug. 3, 1990, abandoned.

[51] Int. Cl.⁵ ............................................. A01K 83/00
[52] U.S. Cl. ...................................... 43/44.8; 43/44.2; 43/43.16
[58] Field of Search ...................... 43/43.16, 44.2, 44.8

[56] References Cited

U.S. PATENT DOCUMENTS 2,745,208  5/1956  Zech ..................................... 43/44.8
3,834,060  9/1974  Wagenknecht ..................... 43/44.8

*Primary Examiner*—Kurt C. Rowan
*Attorney, Agent, or Firm*—Julian C. Renfro

[57] ABSTRACT

A double barbed fishhook adapted for use in conjunction with a soft plastic worm, the fishhook comprising a shaft curving around to form a hook point and primary barb at one end, and having a fishline securing location adjacent the other end. A secondary shaft of short length is located adjacent the fishline securing location, with a secondary barb being located adjacent the end of the secondary shaft. The secondary shaft points generally in the direction of the hook point, but is spaced at least one inch therefrom. The hook point and primary barb are designed to be inserted into an upper middle portion of the plastic worm, and the secondary shaft and barb are designed to receive the head end of the plastic worm, such that the upper portion of the worm extends between the pair of barbs, rather than being forced along the shaft portion of the fishhook. One or more blocking components may be used on the other end of the fishhook, to prevent undesired displacement of the fishing line from the desired location, and the hook point and the secondary shaft may be offset in the same direction from the principal plane of the fishhook.

6 Claims, 3 Drawing Sheets

U.S. Patent    Aug. 24, 1993    Sheet 1 of 3    5,237,772
FIG 1
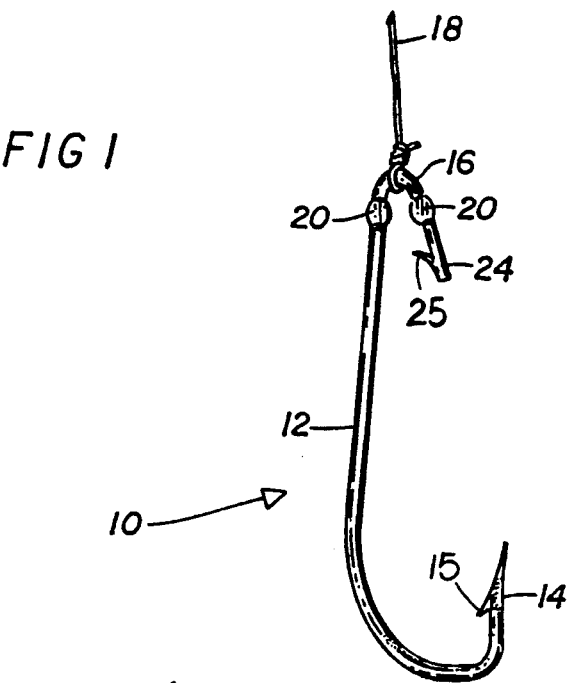
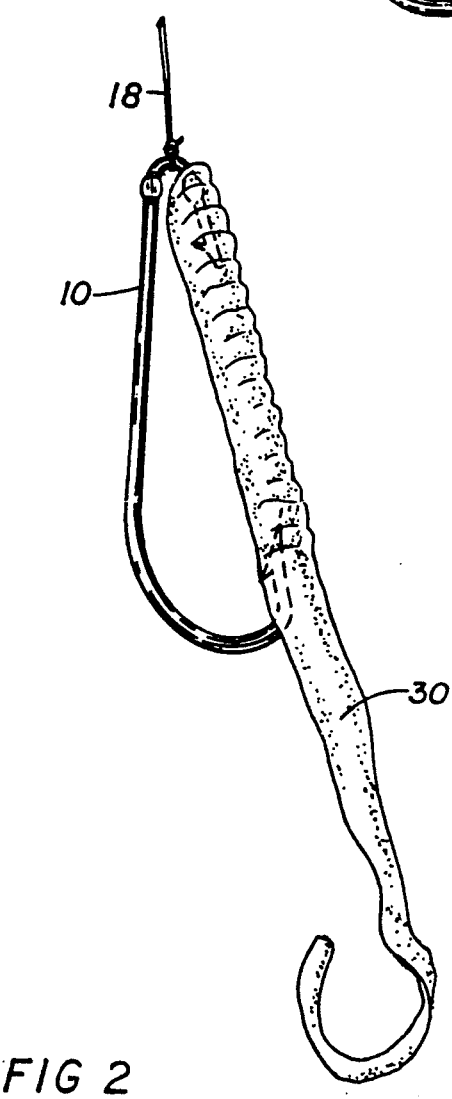
FIG 2
FIG 3

DOUBLE BARBED FISHHOOK IMPROVEMENT

RELATIONSHIP TO COPENDING APPLICATION

This is a continuation-in-part of my copending patent application "Double Barbed Fishhook," Ser. No. 07/562,614, filed Aug. 3, 1990, which is abandoned.

BACKGROUND OF THE INVENTION

Many generations of fishermen have used the well known fishhook, typically made of metal and involving a shaft curving around to form at one end, a point or barb. An eyelet is typically formed at other end of the shaft, to which the fishline is tied. After the hook has been tied to the fishline, it is then but a simple matter to insert a piece of bait on the barb or point, and then lower the hook into the water, or else cast the hook and bait into the water by the use of a rod and reel.

For many generations the fisherman typically had to make a decision between the alternatives of inserting live bait or cut bait onto the hook before casting, but in recent years, the soft plastic worm has come into extensive use by young and old alike. These worms are manufactured in a variety of sizes, shapes and colors, and the soft texture of these worms makes it a relatively simple matter to insert the head of the worm onto the point of the hook. It then is typical to force more of the worm onto the point of the hook, with some fishermen continuing such effort until substantially the entire shaft portion of the hook is covered by the worm, with only the lower portion of the worm not being impaled on the shaft of the hook. Other fishermen are more concerned with moving the head of the worm for a considerable distance onto the shaft of the hook, such that the head of the worm is caused to be brought into contact with the uppermost portion, or eyelet of the hook.

Unfortunately, the soft texture of the plastic worm is such that this insertion of a substantial portion of the length of the worm onto the shaft of the hook frequently becomes a distinct disadvantage. This comes about when a fish seizes the worm in his mouth, for often the soft plastic worm at that time slides down the shaft of the hook, forming a bulk of plastic at the location of the principal barb or point of the hook. This amount of plastic at that crucial location in effect forces the point of the hook out of the fish's mouth.

One prior art patent worthy of note with regard to the instant Double Barbed Fishhook is the Wagenknecht U.S. Pat. No. 3,834,060, which issued Sep. 10, 1974, and which teaches a device having much the appearance of a common safety pin. In his patent, this patentee sets forth that his fish hook utilizes a single wire strand having a barb 10 at one end, and extending from this barb in an arcuate fashion is a hook 11. From the hook 11 the single wire extends in a shank 12 to a loop 13 in the wire which defines the opposite end of the hook structure. The patentee continues on to describe that the loop 13 has at least one complete hoop and terminates in a portion 14 extending somewhat diagonally outwardly to a second shank 15 which is parallel to the shank 12. The shank 15 is stated to extend to the opposite or terminal end of the wire 16 and has thereon a barb 17 directed toward the loop.

The patentee thereafter explains that "... the barbs 10 and 17 are substantially opposite one another ... " and he also explains that "... the spacing between the barbs 10 and 17 is substantially equal to the distance between the barb and the shank 12." Thereafter the patentee states that "... the shanks 12, 15 ends 10 and 17 and loop 13 are generally coplanar to one another with the obvious exception that there is a slight lateral offset at the loop 13 to accommodate the two widths of wire."

It is obvious that Wagenknecht has not provided a fish hook utilizing a primary point, and a secondary point spaced from and directed toward the primary point in a manner permitting a soft plastic worm to extend between the barbs associated with the primary and secondary points. As a matter of fact, the patentee utilizes the term "minnow" many times in his patent Specification. FIG. 2 of this patent illustrates that the minnow 20 is inserted onto the shank 15, with the shank 12 serving to apply pressure against the fish "... to thereby aid in holding it on the shank 15."

It is quite apparent that Wagenknecht does not at all use his "Fish Hook" in the manner taught in the instant invention, for in the present instance the curved primary hook portion engages a mid or abdominal portion of a plastic worm, whereas the spacing of the short secondary shaft is such as to engage the head end of the plastic worm.

The Zech U.S. Pat. No. 2,745,208 utilizes an exceedingly short Specification in which it is stated that his hook "... may be considered to function somewhat like a safety pin in which the bait attaching device 5, of stiff resilient wire, is similar to that portion of a safety pin which has a pointed end."

Like Wagenknecht, patentee Zech states quite specifically in several locations in his Specification that his "Fishhook" is to be used with live bait, for he illustrates a bait or minnow 11 impaled on the portion 10 of his device, which portion 10 extends downwardly from the portion 9 "... in substantially spaced relation to the shank 2 and substantially coplanar therewith ..."

It is therefore manifestly apparent that neither of these patents teaches a double barbed fishhook having a shaft configured to form a primary point and barb at one end, and a short secondary shaft at the other end, with a barb being utilized closely adjacent the end of the secondary shaft. Because the secondary shaft of the instant invention is directed toward the primary point, and is spaced from the point for at least one inch, a plastic lure can readily be mounted to extend between the barbs at these locations in a realistic and highly satisfactory manner, with any bunching of the worm upon the primary point at the time a fish strikes being entirely eliminated.

SUMMARY OF THE INVENTION

In accordance with this invention, a novel hook design has been evolved, whose configuration serves to eliminate the bunching up of the soft plastic worm at the point of the hook when a fish has taken the hook and worm into his mouth.

A fishhook adapted for use in conjunction with a soft plastic worm in accordance with this invention comprises a shaft curving around to a hook point equipped with a primary barb at one end, and having a fishline securing location adjacent the other end. The fishline securing location is defined by a sharply curved shaft portion terminating in a secondary shaft directed generally toward the hook point. The secondary shaft is typically no longer than approximately one-half inch, and is equipped with a barb.

The fishline to be used with my novel fishhook is adapted to be tied around the upper, sharply curved shaft portion. The primary hook point, including the primary barb, is designed to be inserted into a middle portion of the plastic worm, and the secondary shaft and barb are designed to receive the head end of the plastic worm. By virtue of this advantageous arrangement, the upper portion of the body of the worm extends between the barb of the primary hook point, and the barb of the secondary shaft, rather than any portion of the worm being forced along the shaft portion of the fishhook.

It is unnecessary in the use of this new fishhook configuration to create an "eye" of a conventional type to receive the fishline at a location remote from the principal point or barb. This is because the configuration of the sharply curved shaft portion created at a location remote from the primary barb, and relatively near the secondary shaft and its barb is sufficient to prevent loss of the hook from the fishline.

It is therefore a principal object of this invention to provide a double barbed fishhook of highly advantageous design, that can be used most effectively with soft plastic worms.

It is another object of this invention to provide a fishhook of highly effective yet low cost configuration, that will prevent the soft plastic worm from moving into a position that serves to diminish the effectiveness of the hook point and primary barb of the hook.

It is yet another object to provide a fishhook equipped with a secondary shaft and barb that are spaced approximately one and one-quarter inches away from the primary point and barb, such that a plastic worm can extend between the barbs in a highly satisfactory manner.

It is still another object of this invention to provide a fishhook design that does not require a distinct eyelet formed at a location remote from the principal barb or point of the hook, for a sharply curved portion of the shaft of the hook at a location near the secondary shaft is of such configuration as to warrant little risk of the hook being lost from the fishline.

These and other objects, features and advantages of this fishhook design will become more apparent as the description proceeds.

BRIEF DESCRIPTION OF DRAWINGS

FIG. 1 is a view of a preferred embodiment of my new, double barbed hook, revealing the use of a primary hook point, and a secondary shaft disposed at a spaced location therefrom, each equipped with a barb, and also revealing an upper location at which the fishline is fastened, with the sharp curvature of the upper portion of the fishhook making it unnecessary to utilize an "eye" through which the fishline passes;

FIG. 2 is a view revealing the construction I utilize for supporting a soft plastic worm in a highly advantageous and realistic manner, with the upper portion of the worm extending between upper and lower barbs of the fishhook;

FIG. 3 is an edge view revealing the preferred offset of the hook point and the secondary shaft from the plane of the shaft of the hook;

DETAILED DESCRIPTION

Figure 4B:
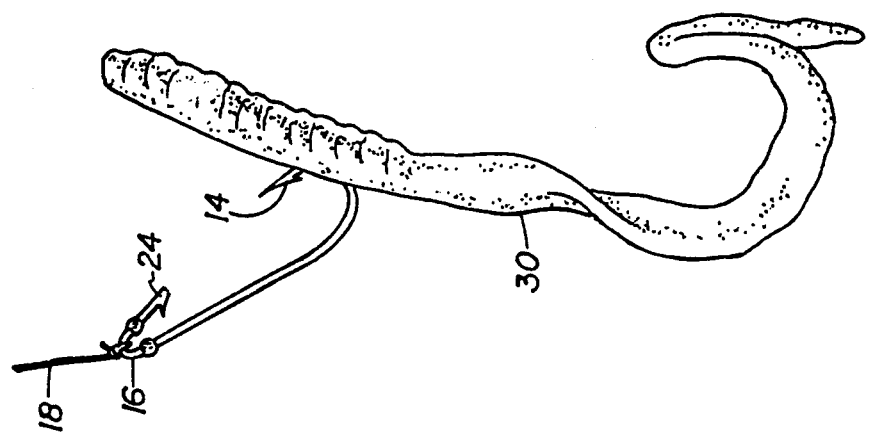
FIG. 4a is a view revealing the manner in which a soft plastic worm has been installed upon the upper and lower barbs of my novel fishhook, with adjacent FIG. 4b revealing the position of the worm after a fish has taken the principal barb or point of the hook into his mouth.

With initial reference to FIG. 1 it is to be seen that I have shown a preferred embodiment of a fishhook 10 in accordance with this invention, which is principally constituted by a shaft or shank 12 extending downwardly and then curving around to form a primary hook or point 14. Just below the hook or point 14 is barb 15 of essentially conventional construction, being configured to resist the fish being able to spit the hook out of his mouth.

In the case of a typical, prior art fishhook, an eyelet is utilized at the end of the shaft or shank 12 opposite the primary hook point, with the fish line to be threaded through the eyelet and then tied into an appropriate knot. In the present double barbed hook 10, however, the conventional eyelet is not used, and in its stead I have configured the upper part of the shaft 12 into a sharply curved portion 16, which I choose to call the fishline securing location. It is at the fishline securing location 16 that the fishing line 18 is to be tied. In order to prevent the line from sliding on the shaft out of the desired position, I may utilize blocking means in the form of either a flat portion 20 or an enlarged portion on each side of the location 16 in FIG. 1 at which the line 18 is tied.

There is no rigid requirement for the amount of curvature of the shaft at the fishline securing location 16, but in certain instances the curvature approaches 180°.

It is important to note in FIG. 1 that I have utilized a short secondary shaft 24 on the opposite end of the shaft 12 from the primary hook point 14, and located at a distance therefrom. As will be noted, the secondary shaft is pointed toward the primary hook point. I prefer for the distance between the primary hook point 14 and the end of the secondary shaft 24 to be not less than one inch, with the spacing preferably being on the order of one and one-fourth inches. As will be noted from FIG. 3, both the primary hook point and its adjacent barb, and the secondary shaft and its adjacent barb are shown to be offset a relatively small amount "X" from the basic plane of the shank or shaft of the hook. This offset is not a stringent requirement of this invention, but an offset, at least of the primary hook point 14, is usually utilized to help inhibit the barb and point of the hook coming out of the mouth of the fish prematurely. Because of the primary hook point 14 preferably being offset, I prefer for the secondary shaft to be offset a like amount, and on the same side of the plane of the shaft of the hook. Like the primary hook point, the secondary shaft 24 has an adjacent barb 25 designed to resist the head of the worm slipping off of the secondary shaft. As shown in FIGS. 1 and 3, the secondary shaft 24 is short, typically being on the order of one-half inch in length.

It is also to be noted in FIG. 3 that one of the flat portions 20 is shown, this flat portion representing the blocking means resisting displacement of the fishline.

With reference to FIG. 2, I there show a preferred manner of using a soft plastic worm 30 in conjunction with my novel hook 10. After the primary hook point 14 has been inserted into a mid-portion of the worm, at a location that would probably correspond to the egg sac of a real worm, the fisherman then inserts the head of the worm onto the end of the secondary shaft 24 and barb 25. It is most important to note that the barb 15 and the barb 25 prevent the soft plastic worm from being easily removed from the hook point 14 and the secondary shaft 24.

It should now be apparent why the primary and secondary barbs are offset in the manner depicted in FIG. 3, for the worm is enabled to hang or extend in a manner in which it is essentially parallel to the basic plane of the hook 10 if the barbs are offset in a like amount, and to the same side of the plane of the hook.

When the worm 30 has been installed upon the hook 10 in the manner generally indicated in FIG. 2, experience has shown that it becomes a tempting target for a fish's attention, with any premature displacement from this position being unlikely.

Figure 4A:
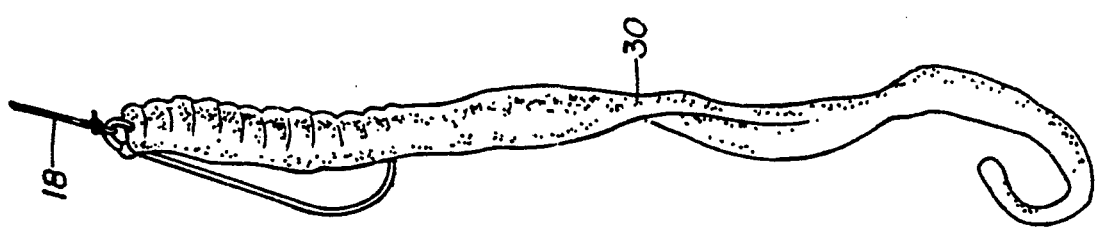

With reference now to sheet of drawing upon which FIGS. 4a and 4b appear, it will be noted in FIG. 4a that neither the primary hook point 14 nor the secondary shaft 24 of the hook 10 are visible, but upon a fish taking the worm 30 into his mouth, the head of the worm readily pulls away from the barb of the short secondary shaft 24. This movement of the worm causes the upper portion of the worm to move sideways, with this in turn causing the primary hook point 14 and barb 15 to break through the sidewall of the plastic worm 30, in the manner depicted in FIG. 4b. Quite advantageously, this lateral movement of the upper part of the worm's body causes the primary hook point 14 and barb 15 to be exposed, which hook point is unencumbered by any portion of the worm 30, meaning that there is no basis for assuming that the fish will be successful in ridding himself of the hook. As is apparent from FIG. 4b, there is no basis for assuming that any excess portion of the worm will be accumulated on or adjacent the primary hook point 14.

Figure 5B:
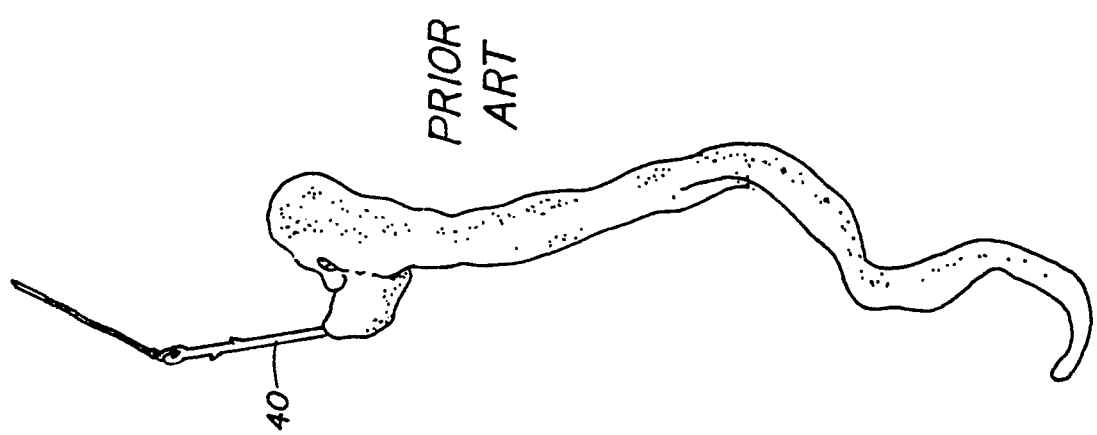
FIG. 5a is a view of a fishhook of the prior art, revealing the manner in which a soft plastic worm is inserted onto a conventional fishhook, whereas adjacent FIG. 5b reveals the unfortunate position typically taken by the soft plastic worm at the time the fish has taken the hook into his mouth.
Figure 5A:
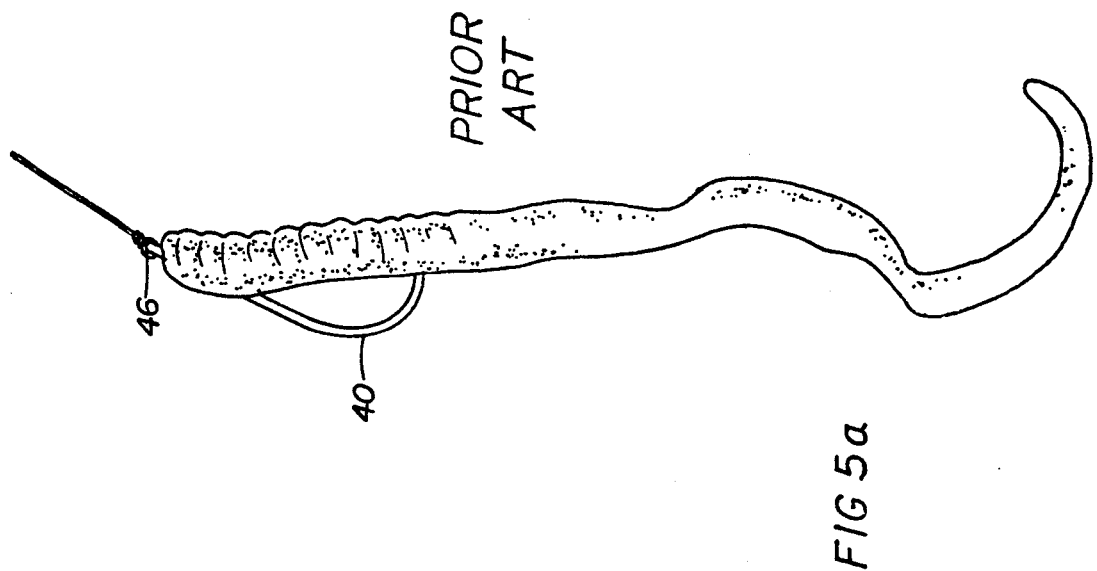

This result is to be contrasted with the prior art depicted in FIGS. 5a and 5b. FIG. 5a represents a conventional fishhook 40, with a single point and barb being utilized at the lower end, and an eyelet 46 utilized at the upper end.

It is a temptation for the fisherman to install the worm in what he regards as a safe and effective manner onto the conventional fishhook 40, by threading substantial portions of the worm onto the shaft of the hook. This has an unfortunate consequence, however, for as depicted in FIG. 5b, upon the fish taking the worm in his mouth, the upper portion of the worm then tends to slide down the shaft or shank 12 of the hook and to bunch up to form a mass of plastic at entirely the wrong location—upon the single point and barb utilized on a conventional fishhook.

As can be readily appreciated, a bulk of plastic accumulated on the single point and barb of the conventional hook greatly increases the possibility of the fish being able to spit the worm and hook entirely out of his mouth, so that he can swim free.

It is thus to be seen that as a consequence of my using a hook equipped with primary and secondary barbs utilized in a spaced apart relationship, the fisherman can have the assurance that he has installed the plastic worm in a safe and secure manner on the barbs, so he presumably will not succumb to the temptation of threading so much of the worm onto the hook as to invite the bunching of the worm onto the barb in the manner depicted in FIG. 5b, at such time as a fish bites.

It is to be understood that my Double Barbed Fishhook can be manufactured in different sizes, depending on the specific use to which the hook is to be put.

Other variations upon this basic idea will be apparent to those skilled in this art, and I am not to be limited in any manner not required by the scope of the appended claims.

I claim:

1. A double barbed fishhook adapted for use in conjunction with a soft plastic worm, said fishhook comprising a shaft curving around to a hook point and primary barb at one end, and having a fishline securing location adjacent the other end, a secondary shaft of short length located adjacent said fishline securing location, said secondary shaft pointing generally in the direction of said hook point and spaced at least one inch away from said hook point, said secondary shaft being approximately one-half inch in length, with there being a secondary barb located adjacent the end of said secondary shaft, said hook point and primary barb being designed to be inserted into an upper middle portion of the plastic worm, and said secondary shaft and barb being designed to receive the head end of the plastic worm, such that the upper portion of the worm extends between the pair of barbs, rather than being forced along the shaft of the fishhook.

2. The double barbed fishhook adapted to be used in conjunction with a soft plastic worm as recited in claim 1 in which blocking means are utilized to prevent the slippage of a fishline away from a desired position on said other end of said fishhook.

3. The double barbed fishhook adapted to be used in conjunction with a soft plastic worm as recited in claim 1 in which said hook point and secondary shaft are offset from the plane in which the shaft of said fishhook is contained.

4. The double barbed fishhook adapted to be used in conjunction with a soft plastic worm as recited in claim 1 in which the end of said secondary shaft is spaced approximately one and one-quarter inches away from said primary point.

5. The double barbed fishhook adapted to be used in conjunction with a soft plastic worm as recited in claim 1 in which the end of said secondary shaft is approximately one-half inch away from said fishline securing location.

6. A double barbed fishhook adapted for use in conjunction with a soft plastic worm, said fishhook comprising a shaft curving around to a hook point and primary barb at one end, and having a fishline securing location adjacent the other end, a secondary shaft of short length located adjacent said fishline securing location, said secondary shaft pointing generally in the direction of said hook point and spaced at least one inch away from said hook point, said secondary shaft having a secondary barb located adjacent the end of said second shaft, said hook point and primary barb being designed to be inserted into an upper middle portion of the plastic worm, and said secondary shaft and barb being designed to receive the head end of the plastic worm, such that the upper portion of the worm extends between the pair of barbs, rather than being forced along the shaft of the fishhook, the distance between said second shaft and said hook point being approximately twice the length of said secondary shaft.

* * * * *